United States Patent
Ryu et al.

(10) Patent No.: US 10,862,099 B2
(45) Date of Patent: Dec. 8, 2020

(54) APPARATUS FOR ENHANCING ELECTROLYTE WETTING IN RECHARGEABLE BATTERY AND ELECTROLYTE WETTING ENHANCING METHOD USING THE SAME

(71) Applicant: Samsung SDI Co., Ltd., Yongin-si (KR)

(72) Inventors: Seungwook Ryu, Yongin-si (KR); Wonsub Seo, Yongin-si (KR); Kyoungkeun Bae, Yongin-si (KR); Hyunsang Joo, Yongin-si (KR); Jongdae Kim, Yongin-si (KR); Sungho Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/529,536

(22) Filed: Aug. 1, 2019

(65) Prior Publication Data
US 2019/0355961 A1    Nov. 21, 2019

Related U.S. Application Data

(62) Division of application No. 15/293,067, filed on Oct. 13, 2016, now Pat. No. 10,411,245.

(30) Foreign Application Priority Data

Oct. 30, 2015   (KR) .................. 10-2015-0152224

(51) Int. Cl.
  *H01M 2/36*    (2006.01)
  *H01M 10/04*   (2006.01)
  *H01M 10/058*  (2010.01)

(52) U.S. Cl.
  CPC ............. *H01M 2/365* (2013.01); *H01M 2/36* (2013.01); *H01M 10/0404* (2013.01); *H01M 10/0468* (2013.01); *H01M 10/058* (2013.01)

(58) Field of Classification Search
  CPC .... H01M 2/365; H01M 2/36; H01M 10/0404; H01M 10/0468; H01M 10/058
  See application file for complete search history.

(56) References Cited

U.S. PATENT DOCUMENTS

| | | | |
|---|---|---|---|
| 8,343,240 B2 | 1/2013 | Shimura et al. |
| 8,974,549 B2 | 3/2015 | Shimura et al. |

(Continued)

FOREIGN PATENT DOCUMENTS

| | | |
|---|---|---|
| CN | 101926027 A | 12/2010 |
| JP | 2009-181862 A | 8/2009 |

(Continued)

OTHER PUBLICATIONS

Translation of KR20110032848.
Chinese Patent Office Action for corresponding Chinese Patent Application No. 201610970609.0, dated Jul. 14, 2020, 8 pages.

*Primary Examiner* — Jane J Rhee
(74) *Attorney, Agent, or Firm* — Lewis Roca Rothgerber Christie LLP

(57) ABSTRACT

An apparatus for enhancing electrolyte wetting in a rechargeable battery, which can improve an electrolyte wetting dispersion and enhancing electrolyte wetting in the rechargeable battery by vacuating gases trapped in an electrode assembly by injecting an electrolyte into the electrode assembly and pushing the rechargeable battery, and an electrolyte wetting enhancing method utilizing the same. The electrolyte wetting enhancing apparatus includes a chamber having an internal space; a battery fixing unit fixed in the internal space of the chamber and including a plurality of rechargeable batteries mounted therein; and a pushing (Continued)

member pushing opposite side surfaces of the plurality of rechargeable batteries. The pushing member pushes the plurality of rechargeable batteries to enhance electrolyte wetting into an electrode assembly including the plurality of rechargeable batteries into which the electrolyte is injected.

8 Claims, 3 Drawing Sheets

(56) References Cited

U.S. PATENT DOCUMENTS

| | | |
|---|---|---|
| 2011/0005050 A1 | 1/2011 | Shimura et al. |
| 2013/0061461 A1 | 3/2013 | Shimura et al. |
| 2014/0377600 A1 | 12/2014 | Guen |
| 2015/0037628 A1 | 2/2015 | Guen |
| 2015/0079429 A1 | 3/2015 | Han et al. |

FOREIGN PATENT DOCUMENTS

| | | |
|---|---|---|
| JP | 2013-152834 A | 8/2013 |
| KR | 2011-0032848 A | 3/2011 |
| KR | 2012-0033647 A | 4/2012 |

APPARATUS FOR ENHANCING ELECTROLYTE WETTING IN RECHARGEABLE BATTERY AND ELECTROLYTE WETTING ENHANCING METHOD USING THE SAME

CROSS-REFERENCE TO RELATED APPLICATION

This application is a divisional of U.S. patent application Ser. No. 15/293,067, filed Oct. 13, 2016, which claims priority to and the benefit of Korean Patent Application No. 10-2015-0152224, filed on Oct. 30, 2015, in the Korean Intellectual Property Office, the disclosure of both of which is incorporated herein by reference in its entirety.

BACKGROUND

1. Field

The following description relates to an apparatus for enhancing electrolyte wetting in a rechargeable battery and an electrolyte wetting enhancing method utilizing the same.

2. Description of the Related Art

Recently, with the increasing demand for portable electronic devices, demand for rechargeable batteries as energy sources is rapidly increasing. In particular, lithium rechargeable batteries are receiving lots of (e.g., the highest) attention due to their high capacity.

Along with the high capacity of rechargeable batteries, since an active material composite density may increase, electrolyte wetting of an electrode is becoming more and more important. If electrolyte wetting capability is poor in manufacturing a rechargeable battery, the capacity of the rechargeable battery may be lowered and the electrode reactions may concentrate on local regions, resulting in the local precipitation of lithium metal, thereby lowering the stability of the rechargeable battery.

In addition, as the size of an electrode plate is increased, a time required for electrolyte wetting may also be increased, thereby lowering the manufacturability (e.g., productivity) of rechargeable batteries. Further, non-uniform electrolyte wetting may deteriorate electrode characteristics, thereby shortening a cycle life of the battery.

SUMMARY

Aspects according to one or more embodiments of the present invention are directed toward an apparatus for enhancing electrolyte wetting in a rechargeable battery, which can improve an electrolyte wetting dispersion and enhancing electrolyte wetting in the rechargeable battery by vacuating gases trapped in an electrode assembly by injecting an electrolyte into the electrode assembly and pushing the rechargeable battery; and an electrolyte wetting enhancing method utilizing the electrolyte wetting enhancing apparatus.

Aspects according to one or more embodiments of the present invention are also directed toward an apparatus for enhancing electrolyte wetting in a rechargeable battery, which can improve an electrolyte wetting dispersion and enhancing electrolyte wetting in the rechargeable battery by adopting a pressure difference between the inside and the outside of a pouch; and an electrolyte wetting enhancing method utilizing the electrolyte wetting enhancing apparatus.

The above and other aspects of the present invention will be described in the following description of exemplary embodiments, or will be apparent from the following description of exemplary embodiments.

According to an embodiment of the present invention, an apparatus for enhancing electrolyte wetting in a rechargeable battery includes a chamber having an internal space; a battery fixing unit in the internal space of the chamber and configured to have a plurality of rechargeable batteries mounted therein; and a pushing member configured to push opposite side surfaces of the plurality of rechargeable batteries. The pushing member is configured to push the plurality of rechargeable batteries to enhance electrolyte wetting into an electrode assembly of each of the plurality of rechargeable batteries into which the electrolyte is injected.

The electrolyte wetting enhancing may further include a pressure pump connected to the chamber and configured to pressurize the chamber to maintain the internal space of the chamber in a pressurized state.

The electrolyte wetting enhancing apparatus may further include a vacuum pump connected to the chamber and configured to vacuate the chamber to create a vacuum state.

According to another embodiment of the present invention, a method for enhancing electrolyte wetting in a rechargeable battery includes injecting an electrolyte into a plurality of rechargeable batteries mounted in a battery fixing unit provided in an internal space of a chamber; and pushing opposite side surfaces of the plurality of rechargeable batteries into which the electrolyte is injected utilizing a pushing member at a constant time interval.

After the injecting of the electrolyte, the electrolyte wetting enhancing method may further include sealing the plurality of rechargeable batteries.

The pushing member may push the plurality of rechargeable batteries at the constant time interval of 20 to 30 times per minute for 3 to 8 minutes.

After the injecting of the electrolyte, the electrolyte wetting enhancing method may further include pressurizing the chamber by driving a pressure pump to maintain the internal space of the chamber in a pressurized state.

The plurality of rechargeable batteries may be pushed in a state in which the internal space of the chamber is maintained in a vacuum state by vacuating the chamber by driving the pressure pump.

In the pressurizing of the chamber, the chamber is pressurized to maintain the internal space of the chamber in the pressurized state of 4 to 8 bar, and in the pushing of the opposite side surfaces, the pressurized state of the internal space of the chamber is decompressed to −40 to −80 kPa.

After the pushing of the opposite side surfaces, the electrolyte wetting enhancing method may further include sealing the plurality of rechargeable batteries in a vacuum state.

As described above, in the electrolyte wetting enhancing apparatus in a rechargeable battery according to an embodiment of the present invention and in the electrolyte wetting enhancing method utilizing the electrolyte wetting enhancing apparatus, an electrolyte wetting dispersion can be improved and electrolyte wetting in the rechargeable battery can be enhanced by vacuating gases trapped in an electrode assembly by injecting an electrolyte into the electrode assembly and pushing the rechargeable battery.

Also, in the electrolyte wetting enhancing apparatus in a rechargeable battery according to an embodiment of the present invention and in the electrolyte wetting enhancing method utilizing the electrolyte wetting enhancing apparatus, an electrolyte wetting dispersion can be improved and electrolyte wetting in the rechargeable battery can be enhanced by adopting a pressure difference between the inside and the outside of a pouch.

BRIEF DESCRIPTION OF THE DRAWINGS

The above and other features of the present invention will become more apparent by describing in more detail exemplary embodiments thereof with reference to the attached drawings in which.

DETAILED DESCRIPTION

Figure 1:
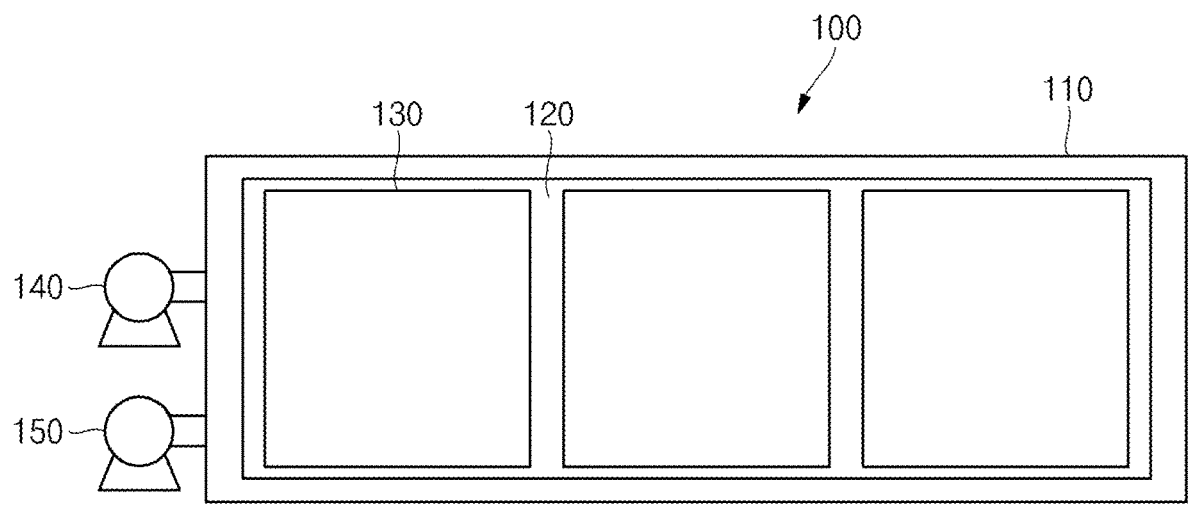
FIG. 1 is a schematic view illustrating a structure of an electrolyte wetting enhancing apparatus in a rechargeable battery according to an embodiment of the present invention.

Hereinafter, examples of embodiments of the invention will be described in more detail with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the invention to those skilled in the art.

In the drawings, the thickness of layers and regions are exaggerated for clarity. Like numbers refer to like elements throughout. As used herein, the term "and/or" includes any and all combinations of one or more of the associated listed items. Also, the term "exemplary" is intended to refer to an example or illustration. As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Figure 2:
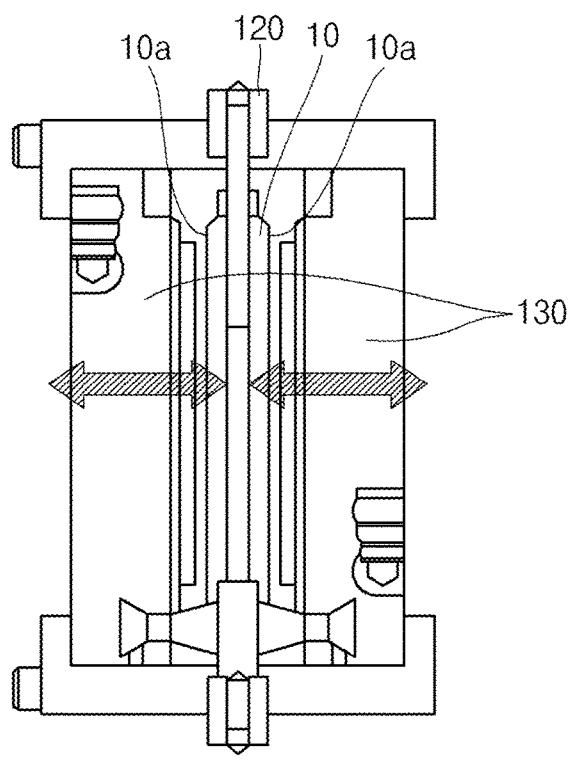
FIG. 2 is a side view illustrating an internal structure of a chamber in the electrolyte wetting enhancing apparatus shown in FIG. 1.
Figure 3:
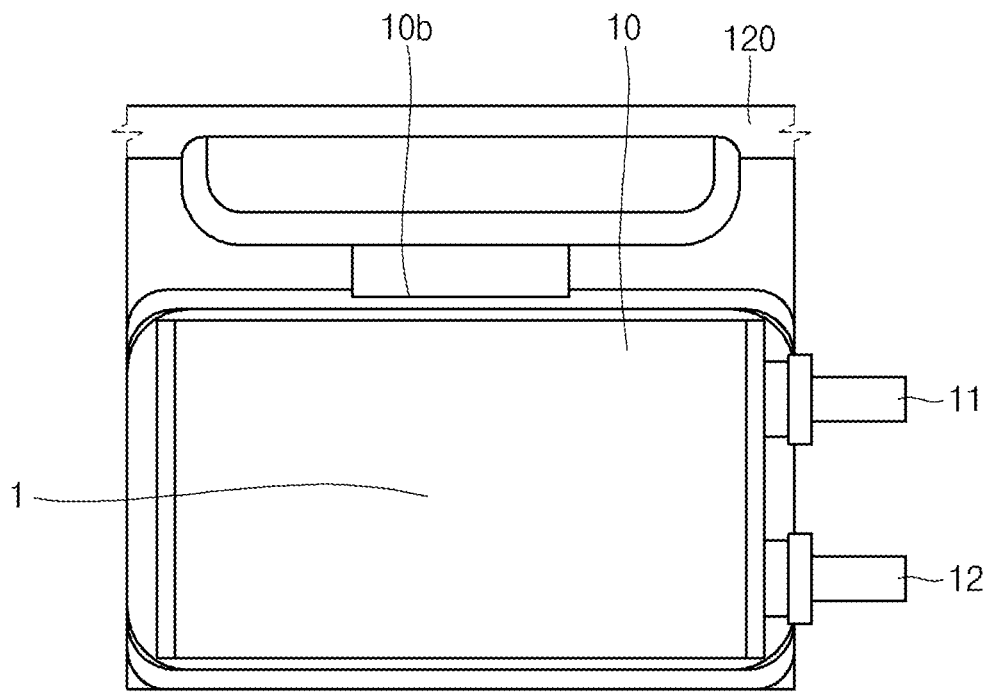
FIG. 3 is a cross-sectional view illustrating a rechargeable battery mounted in a battery fixing unit of the electrolyte wetting enhancing apparatus shown in FIG. 1.

Referring to FIG. 1, a schematic view illustrating a structure of an electrolyte wetting enhancing apparatus in a rechargeable battery according to an embodiment of the present invention is illustrated. Referring to FIG. 2, a side view illustrating an internal structure of a chamber in the electrolyte wetting enhancing apparatus shown in FIG. 1 is illustrated. Referring to FIG. 3, a cross-sectional view illustrating a rechargeable battery mounted in a battery fixing unit of the electrolyte wetting enhancing apparatus shown in FIG. 1 is illustrated. Hereinafter, a structure of an electrolyte wetting enhancing apparatus 100 in a rechargeable battery according to an embodiment of the present invention will be described with reference to FIGS. 1 to 3.

As illustrated in FIG. 1, the electrolyte wetting enhancing apparatus 100 in a rechargeable battery includes a chamber 110, a battery fixing unit 120 accommodated in the chamber 110 and having a plurality of rechargeable batteries 10 fixed thereto, and a pushing member 130 applying a pressure to a plurality of rechargeable batteries 10 by pushing the plurality of rechargeable batteries 10 (e.g., by pushing two opposite side surfaces of each of the plurality of rechargeable batteries to move towards each other) at a constant time interval. In addition, the electrolyte wetting enhancing apparatus 100 may further include a vacuum pump 140 vacuating the chamber 110 to create a vacuum state in the chamber 110, and a pressure pump 150 for increasing an internal pressure of the chamber 110.

Each of the plurality of rechargeable batteries 10 may include an electrode assembly 1 (formed by interposing a separator as an insulator between a positive electrode plate and a negative electrode plate) and a thin flexible pouch incorporating the electrode assembly 1. That is, the plurality of rechargeable batteries 10 may be pouch type batteries each having the electrode assembly 1 accommodated in an internal space provided by welding edges of the thin flexible pouch. The electrode assembly 1 may be formed by stacking the positive electrode plate, the separator and the negative electrode plate and winding the stacked structure into a jelly-roll shape.

In each of the plurality of rechargeable batteries 10, the positive electrode plate and the negative electrode plate are electrically connected to a positive electrode tab 11 and a negative electrode tab 12, respectively, which are exposed to the outside through welded portions of one side of the pouch. The plurality of rechargeable batteries 10 may have planar long side surfaces 10a facing each other. For example, the pouch of each of the plurality of rechargeable batteries 10 may have a planar top side surface and a planar bottom side surface facing the planar top side surface, and four side surfaces connecting the top side surface and the bottom side surface. The four side surfaces may each include a welded portion, and may be configured such that the welded portion of one of the side surfaces (excluding the side surface of the pouch having the welded portions through which the positive electrode tab 11 and the negative electrode tab 12 are exposed to the outside), among the four sides of each of the long side surfaces 10a, may not be welded prior to the injection of the electrolyte. That is, the welded portions of one side of each of the plurality of rechargeable batteries 10 may be opened. A rounded side surface (among the four side surfaces connecting a top side surface and a bottom side surface) of the electrode assembly 1 may be exposed to the outside through one open side 10b of each of the plurality of rechargeable batteries 10.

The chamber 110 has an internal space. The chamber 110 may include a lower case and an upper cover, which are engaged with each other after the plurality of rechargeable batteries 10 are mounted in the chamber 110, thereby hermetically closing the internal space.

The battery fixing unit 120 may be mounted and fixed in the internal space of the chamber 110. The battery fixing unit 120 may be in the shaped of a frame. The plurality of rechargeable batteries 10 may be detachably mounted in an internal space of the frame of the battery fixing unit 120. The plurality of rechargeable batteries 10 may be aligned in the battery fixing unit 120 such that the two long side surfaces (e.g., the top and bottom side surfaces) are exposed to the outside (e.g., not covered by the frame of the battery fixing unit 120) and the opened welded portions face upward. In addition, the long side surfaces of the plurality of rechargeable batteries 10 may be coplanarly positioned. The plurality of rechargeable batteries 10 may be mounted in the battery fixing unit 120 to be spaced apart from each other, but aspects of the present invention are not limited thereto.

The pushing member 130 may include (e.g., consist of) two flat panels 131 facing each other, and may be mounted within the chamber 110.

The pushing member 130 may be mounted in the chamber 110 to face the two long side surfaces (e.g., the top and bottom side surfaces) of the plurality of rechargeable batteries 10. The pushing member 130 may include (e.g., consist of) a set (e.g., a set of panels) having two planar panels facing each other. The pushing member 130 may include (e.g., consist of) a plurality of sets, that is, as many sets as the plurality of rechargeable batteries 10, so as to individually push (e.g., apply pressure to) the plurality of rechargeable batteries 10. However, the pushing member 130 may include (e.g., consist of) a single set to push the plurality of rechargeable batteries 10 at a time (e.g., at the same time). However, the present invention does not limit the number of sets of the pushing member 130. The pushing member 130 may be electrically connected to a driver and may be driven by controlling the driver. The pushing member 130 may push opposite long side surfaces of each of the rechargeable batteries 10 at the same time interval or at a constant time interval.

The vacuum pump 140 may be a pump vacuating the chamber 110 to create a vacuum state of a set or predetermined pressure. The vacuum pump 140 may be mounted outside the chamber 110 and may exhaust the internal air of the chamber 110, thereby maintaining the internal space of the chamber 110 in the vacuum state.

The pressure pump 150 may be a pump pressurizing the chamber 110 to maintain the internal space of the chamber 110 in a pressurized state of a set or predetermined pressure. The pressure pump 150 may be mounted outside the chamber 110 and may maintain the internal space of the chamber 110 in the pressurized state of a set or predetermined pressure by supplying gas (e.g., gases) to the internal space of the chamber 110.

Figure 4:
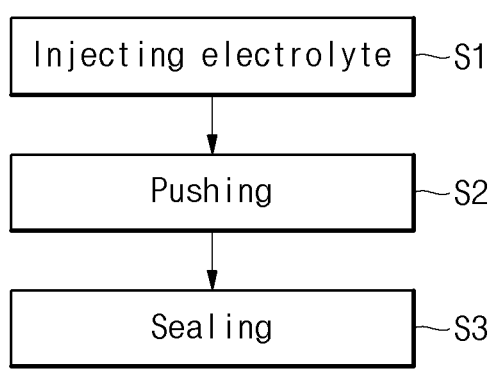
FIG. 4 is a flowchart illustrating an exemplary electrolyte wetting enhancing method of the electrolyte wetting enhancing apparatus shown in FIG. 1.

Hereinafter, an electrolyte wetting enhancing method utilizing the electrolyte wetting enhancing apparatus 100 in a rechargeable battery will be described with reference to FIG. 4. As illustrated in FIG. 4, the electrolyte wetting enhancing method utilizing the electrolyte wetting enhancing apparatus 100 may include acts (e.g., steps) of injecting an electrolyte and then pushing.

First, the plurality of rechargeable batteries 10 are mounted in the battery fixing unit 120 provided within the chamber 110. Thereafter, the electrolyte is injected into a pouch through the open side 10b of each of the plurality of rechargeable batteries 10 mounted in the chamber 110 (S1).

After the injecting of the electrolyte (S1), in the pushing (S2), the plurality of rechargeable batteries 10 are pushed (e.g., pressed) by the pushing member 130 at a constant time interval. That is, the pushing member 130 may push opposite long side surfaces of each of the rechargeable batteries 10 at the same time interval or at a constant time interval. In one embodiment, the pushing member 130 may repeat the process of contacting the opposite side surfaces of each of the rechargeable batteries 10 to apply a set or predetermined force or pressure, and withdrawing to disengage from the opposite side surfaces of each of the rechargeable batteries 10 at a constant time interval.

The gas (e.g., gases) trapped in the electrode assembly 1 of each of the rechargeable batteries 10 may be exhausted (e.g., discharged) to the outside (of the rechargeable battery) by the pushing member 130. For example, the pushing member 130 may push the plurality of rechargeable batteries 10 (e.g., apply pressure to the top and bottom side surfaces) at the constant time interval of 20 to 30 times per minute (e.g., the process of contacting the opposite side surfaces of each of the rechargeable batteries 10 to apply a set or predetermined force or pressure, and withdrawing to disengage from the opposite side surfaces of each of the rechargeable batteries 10 is repeated 20 to 30 times per minute). In addition, in order to enhance electrolyte wetting into the electrode assembly 1, the pushing member 130 may push the plurality of rechargeable batteries 10 for at least 3 minutes (e.g., the process of contacting the opposite side surfaces of each of the rechargeable batteries 10 to apply a set or predetermined force or pressure, and withdrawing to disengage from the opposite side surfaces of each of the rechargeable batteries 10 is repeated at a set or predetermined time interval of 20 to 30 times per minute for 3 to 8 minutes). In the pushing (S1), the gas (e.g., gases) trapped in the electrode assembly 1 may be removed by pushing the plurality of rechargeable batteries 10. In addition, as described above, in the plurality of rechargeable batteries 10, an electrolyte wetting dispersion can be improved by exhausting the gases trapped in the electrode assembly 1. Further, a time required for apparent electrolyte wetting to reach 100% may be shortened by exhausting the internal gases trapped in the electrode assembly 1 in the pushing (i.e., the act of pushing) (S2).

After the pushing (S2), the open side 10b of each of the plurality of rechargeable batteries 10 may be sealed (S3).

However, the sealing (S3) may be performed between the injecting of the electrolyte (S1) and the pushing (S2). That is, in a case where electrolyte wetting of the plurality of rechargeable batteries 10 is enhanced just by the pushing member 130, the sealing (S3) of the open side 10b of the rechargeable battery 10 may be performed before or after the pushing (S2).

Figure 5:
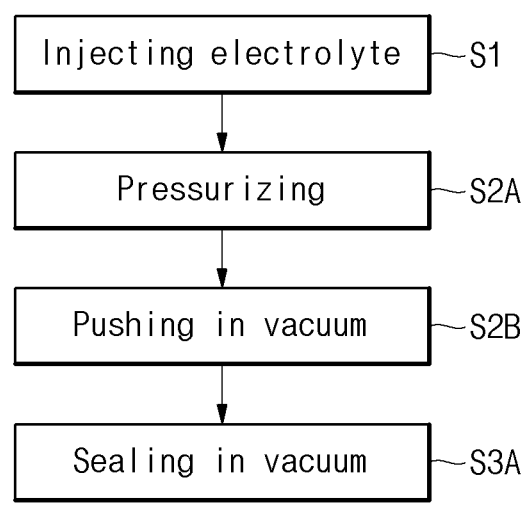
FIG. 5 is a flowchart illustrating another exemplary electrolyte wetting enhancing method of the electrolyte wetting enhancing apparatus shown in FIG. 1.

In order to further enhance electrolyte wetting more than in the electrolyte wetting enhancing method shown in FIG. 4, pressurizing (S2A) and pushing in a vacuum state (S2B) may be performed instead of the pushing (S2), as illustrated in FIG. 5. In addition, after the pushing in the vacuum state (S2B), sealing in a vacuum state (S3A) may be performed.

In the pressurizing (S2A), the chamber 110 is pressurized to maintain the internal space of the chamber 110 in a pressurized state. That is, in the pressurizing (S2A), the pressure pump 150 is driven to make the internal space of the chamber 110 in the pressurized state, creating a pressure difference between the inside and the outside of the pouch of each of the plurality of rechargeable batteries 10 into which the electrolyte is injected. The pressure pump 150 pressurizes the chamber 110 to maintain the internal space of the chamber 110 in the pressurized state of 4 to 8 bar. Here, the pressurized state is, for example, maintained for more than 3 minutes. If the internal space of the chamber 110 is maintained in the pressurized state, the pouch of each of the plurality of rechargeable batteries 10 may be compressed due to the pressure difference between the inside and the outside of the pouch, thereby further enhancing the electrolyte wetting into the electrode assembly 1.

In the pushing in a vacuum state (S2B), the internal space of the chamber 110 is decompressed to the vacuum state when the plurality of rechargeable batteries 10 are pushed by the pushing member 130. That is, in the vacuum state, the plurality of rechargeable batteries 10 may be periodically pushed by the pushing member 130. In this case, since a pressure of the outside of the pouch is lower than that of the inside of the pouch (that is, the outside of the pouch is in a vacuum), the gas (e.g., gases) trapped in the electrode assembly 1 of each of the plurality of rechargeable batteries 10 can be more efficiently exhausted. As described above, the plurality of rechargeable batteries 10 may have an improved electrolyte wetting dispersion by exhausting the gases trapped in the electrode assembly 1. The vacuum state of the chamber 110 may be created by driving the vacuum pump 140 to reach −40 to −80 kPa (e.g., 40 to 80 kPa below atmosphere pressure). As described above, after the pressurizing (S2A) and the pushing in a vacuum state (S2B), a time required for apparent wetting to reach 100% may be shortened.

In addition, after the pushing in a vacuum state (S2B), the open side of the rechargeable battery 10 may be sealed in the vacuum state (S3A). That is, in order to enhance electrolyte wetting, the pressure difference is created between the inside and the outside of the pouch of the rechargeable battery 10 in the pressurizing (S2A) and the pushing in a vacuum state (S2B). In addition, in order to improve an electrolyte wetting dispersion, after the pressurizing (S2A) and the pushing in a vacuum state (S2B), the sealing in a vacuum state (S3A) is performed. Here, the open side of the rechargeable battery 10 may be sealed in a high vacuum state of −90 kPa.

While the apparatus for enhancing electrolyte wetting in a rechargeable battery and the enhancing method utilizing the same of the present invention have been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. An electrolyte wetting enhancing method for enhancing electrolyte wetting in a rechargeable battery, the electrolyte wetting enhancing method comprising:
    injecting an electrolyte into a plurality of rechargeable batteries mounted in a battery fixing unit provided in an internal space of a chamber; and
    pushing opposite side surfaces of the plurality of rechargeable batteries into which the electrolyte is injected utilizing a pushing member at a substantially constant time interval.

2. The electrolyte wetting enhancing method of claim 1, further comprising sealing the plurality of rechargeable batteries after the injecting of the electrolyte.

3. The electrolyte wetting enhancing method of claim 1, wherein the pushing member pushes the plurality of rechargeable batteries at the constant time interval of 20 to 30 times per minute for 3 to 8 minutes.

4. The electrolyte wetting enhancing method of claim 1, further comprising pressurizing the chamber by driving a pressure pump to maintain the internal space of the chamber in a pressurized state after the injecting of the electrolyte.

5. The electrolyte wetting enhancing method of claim 4, wherein the plurality of rechargeable batteries are pushed in a state in which the internal space of the chamber is maintained in a vacuum state by vacuating the chamber by driving the pressure pump.

6. The electrolyte wetting enhancing method of claim 4, wherein in the pressurizing of the chamber, the chamber is pressurized to maintain the internal space of the chamber in the pressurized state of 4 to 8 bar, and in the pushing of the opposite side surfaces, the pressurized state of the internal space of the chamber is decompressed to −40 to −80 kPa.

7. The electrolyte wetting enhancing method of claim 5, further comprising sealing the plurality of rechargeable batteries in a vacuum state after the pushing of the opposite side surfaces.

8. The electrolyte wetting enhancing method of claim 1, wherein the pushing of the opposite side surfaces is conducted by repeating a process of contacting the opposite side surfaces of each of the rechargeable batteries to apply a set force or pressure, and withdrawing to disengage from the opposite side surfaces of each of the rechargeable batteries at the substantially constant time interval.

* * * * *